United States Patent [19]
Hershkowitz et al.

[11] Patent Number: 5,980,782
[45] Date of Patent: *Nov. 9, 1999

[54] FACE-MIXING FLUID BED PROCESS AND APPARATUS FOR PRODUCING SYNTHESIS GAS

[75] Inventors: Frank Hershkowitz, Liberty Corner; Harry W. Deckman; Robert P. Reynolds, both of Clinton, all of N.J.; Constantine P. Gonatas, Houston, Tex.; John W. Fulton, Randolph, N.J.; Leonard Schoenman, Citrus Heights; Jack I. Ito, Sacramento, both of Calif.; Russell J. Koveal, Baton Rouge, La.; Lavanga R. Veluswamy, Baton Rouge, La.; James H. Taylor, Baton Rouge, La.; Alfredo M. Lopez, Randolph, N.J.

[73] Assignee: Exxon Research and Engineering Co., Florham Park, N.J.

[ * ] Notice: This patent is subject to a terminal disclaimer.

[21] Appl. No.: 08/845,708

[22] Filed: Apr. 25, 1997

[51] Int. Cl.⁶ .............................. C07C 1/02; C07C 27/00; C01B 31/18; C01B 3/24
[52] U.S. Cl. ...................... 252/373; 423/650; 423/418.2; 518/703
[58] Field of Search .................................. 423/139, 418.2, 423/650; 252/372, 370, 373; 518/703

[56] References Cited

U.S. PATENT DOCUMENTS

| | | | |
|---|---|---|---|
| 3,542,894 | 11/1970 | Bartholome et al. | 260/679 |
| 3,881,701 | 5/1975 | Schoenman et al. | 259/4 |
| 4,722,181 | 2/1988 | Yu | 60/39 |

(List continued on next page.)

FOREIGN PATENT DOCUMENTS

| | | |
|---|---|---|
| 2153304 | 7/1995 | Canada . |
| 0303438 | 2/1989 | European Pat. Off. . |
| 0303439 | 2/1989 | European Pat. Off. . |
| 0312133 | 4/1989 | European Pat. Off. . |
| 932429 | 7/1963 | United Kingdom . |
| 2202321 | 9/1988 | United Kingdom . |
| WO-90/06281 | 6/1990 | WIPO . |
| WO-90/06282 | 6/1990 | WIPO . |
| WO/90/06297 | 6/1990 | WIPO . |

OTHER PUBLICATIONS

"Improve syngas production using autothermal reforming" by Christensen et al., Hydrocarbon Processing, Mar. 1994, pp. 1 to 6.

"Burners for Secondary and Autothermal Reforming—Design and Industrial Performance" by Christensen et al, AIChE Ammonia Safety Symposium, Vancouver, BC, Canada Paper No. 3g, Oct. 4, 1994 pp. 1 to 15.

Primary Examiner—Gary P. Straub
Assistant Examiner—Eileen E. Nave
Attorney, Agent, or Firm—Jay Simon

[57] ABSTRACT

A novel fluidized bed syngas (FBSG) injector/reactor apparatus and an efficient process for the partial oxidation and steam reforming of light hydrocarbon gases such as methane, to convert such gases to useful synthesis gas containing CO and $H_2$ for recovery and/or subsequent hydrocarbon synthesis. Sources of a light hydrocarbon gas, such as methane, and oxygen or an oxygen-containing gas are preheated and pressurized and injected through gas orifices of an injector at high velocity and comparable momentums into admixture with each other in the desired proportions, at a plurality of mixing chambers or recessed cups which are open to the fluidized bed reaction zone of a reaction chamber and are spaced over the face of the injector, to form a reactant gas premix having a pressure drop of at least 1% through the injector. The gaseous premix is injected in a time period which is less than its autoignition time, preferably less than 9 milliseconds, at a velocity between about 25 to 1000 feet/second, into a partial oxidation reaction zone comprising a fluid bed catalyst so that the gas mixture reacts in the catalyst bed, to reduce the amounts of $CO_2$, $H_2O$ and heat produced by the partial oxidation reaction to favor the desired stoichiometry. The formed syngas is cooled and recovered, such as use in further synthesis processing.

25 Claims, 5 Drawing Sheets

U.S. PATENT DOCUMENTS

| | | | |
|---|---|---|---|
| 4,767,569 | 8/1988 | Brophy et al. | 252/373 |
| 4,801,092 | 1/1989 | Webber et al. | 239/418 |
| 4,836,831 | 6/1989 | Martens | 48/197 |
| 4,844,837 | 7/1989 | Heck et al. | 252/373 |
| 4,877,550 | 10/1989 | Goetsch et al. | 252/373 |
| 5,143,647 | 9/1992 | Say et al. | 252/373 |
| 5,160,456 | 11/1992 | Lahn et al. | 252/373 |
| 5,292,246 | 3/1994 | Gateau et al. | 431/328 |
| 5,492,649 | 2/1996 | Christensen | 252/372 |
| 5,510,056 | 4/1996 | Jacobs et al. | 252/373 |
| 5,588,974 | 12/1996 | Tiller et al. | 48/127.9 |
| 5,637,815 | 6/1997 | Takahata et al. | 75/236 |

FACE-MIXING FLUID BED PROCESS AND APPARATUS FOR PRODUCING SYNTHESIS GAS

BACKGROUND OF THE INVENTION

1. Field of the Invention

The present invention relates to improvements in processes and apparatus for producing synthesis gas, or syngas, from light hydrocarbons such as methane or natural gas by the partial oxidation thereof. Such syngas, comprising a mixture of carbon monoxide and hydrogen, is useful for the preparation of a variety of other valuable chemical compounds, such as by application of the Fischer-Tropsch process.

The combustion stoichiometry of methane gas at 1000° F. is highly exothermic and produces $CO_2$ and $H_2O$ according to the following reaction:

$$CH_4 + 2O_2 \rightarrow CO_2 + 2H_2O \quad (-190.3 \text{ kcal/g mol } CH_4).$$

The formed gases are not useful for the production of valuable chemical compounds, and the high temperatures generated present problems with respect to reactors and catalysts which would be required to produce valuable products from the formed gases.

It is known to produce useful gases, known as synthesis gases or syngases, by partial oxidation of methane and other light hydrocarbon gases, by steam or $CO_2$ reforming of methane and other light hydrocarbon gases, or by some combination of these two chemistries. The partial oxidation reaction of methane is a less highly exothermic reaction which, depending upon the relative proportions of the methane and oxygen and the reaction conditions, can proceed according to the following stoichiometry:

$$2CH_4 + 2O_2 = 2CO + 2H_2 + 2H_2O \quad (-64 \text{ kcal/g mol } CH_4).$$

$$2CH_4 + 1.5O_2 = 2CO + 3H_2 + 1H_2O \quad (-34.9 \text{ kcal/g mol } CH_4).$$

or $$2CH_4 + O_2 = 2CO + 4H_2 + 0H_2O \quad (-5.7 \text{ kcal/g mol } CH_4).$$

It is most desirable to enable the partial oxidation reaction to proceed according to the latter reaction in order to produce the most valuable syngas and minimize the amount of heat produced, thereby protecting the apparatus and the catalyst bed, and to reduce the formation of steam, thereby increasing the yield of hydrogen and carbon monoxide, and enabling the steam-reforming reaction to convert any steam and hydrogen into useful syngas components.

Conventional syngas-generating processes include gas phase partial oxidation process (GPOX), the autothermal reforming process (ATR), the fluid bed syngas generation process (FBSG), the catalytic partial oxidation process (CPO) and various processes for steam reforming. Each of these processes has advantages and disadvantages when compared to each other.

The ATR process and the FBSG process involve a combination of gas phase partial oxidation and steam reforming chemistry.

In the ATR process, illustrated, for example, by U.S. Pat. No. 5,492,649 and Canadian Application 2,153,304, the gases are intended to react before they reach the catalyst, i.e., the oxidation chemistry occurs in the gas phase, and only the steam reforming chemistry occurs in the catalytic bed. In fact, long residence times are required because diffusion flames are initiated with a large amount of over-oxidation, accompanied by a large heat release. Thus, time is required for the relatively slow, endothermic gas phase steam reforming reactions to cool the gas enough for introduction into the catalyst bed to prevent thermal damage to the catalyst.

In the FBSG process illustrated for example by U.S. Pat. Nos. 4,877,550; 5,143,647 and 5,160,456, the hydrocarbon gas, such as methane, and oxygen or an oxygen-supplying gas are introduced separately into a catalyst fluid bed for mixing therewithin. While the gases may be introduced at a plurality of sites, to more evenly distribute the gases over the inlet of the fluid bed of the reactor, the fact that the gases mix within the fluid bed results in over-oxidation hot spots and catalyst sintering or agglomeration due to the oxygen concentration being higher and closer to full-combustion stoichiometry in areas closest to the oxygen injection sites. The gas phase partial oxidation and steam reforming chemistry employed in the FBSG and the Autothermal Reforming (ATR) processes have very similar material balance when using similar feed. However, ATR is limited in size by the scaleability of its injector design, and the more-scaleable FBSG is economically debited by the cost of fluid solids and dust cleanup and by the expense of replacing agglomerated and/or eroded catalyst. The dust comprises catalyst fines due to catalyst attrition in the bed, and these fines are expensive to clean out of the syngas. While the chemistry is correct, these two processes have significant drawbacks. Both require very large reactors. For FBSG there is a significant expense in fluid solids management. For Autothermal Reforming there is a large and problematic methane/oxygen feed nozzle.

Fluid bed processes are well known for the advantages they provide in heat and mass transfer characteristics. Such processes allow for substantially isothermal reactor conditions, and are usually effective in eliminating temperature runaways or hot spots. However, with $O_2$ injection the complete elimination of hot spots is impossible, although the fluid bed does tend to minimize the heat intensity. Catalyst strength or attrition resistance is important for maintaining the integrity of the catalyst and minimizing the formation of fine particles that may be lost from the fluidized bed system, especially those particles not recoverable by use of cyclones and deposited in down stream equipment causing fouling or reverse reactions as temperature is decreased. Erosivity or the tendency to erode equipment must be contained since catalyst erosivity usually increases in catalysts with increased attrition resistance.

Additionally, the relatively high temperatures, e.g., above about 1650° F., found in reforming reactions, where oxygen gas is present can cause agglomeration of the fluidized catalyst particles, leading to lower catalytic efficiency (e.g. lower conversion), larger particles that are more difficult to fluidize, greater wear on equipment due to greater momentum and impact forces, and clogging of lines. For example, a common catalytic material nickel, even when deposited in small amounts on a suitable carrier e.g., less than about 5 wt % nickel on a support, tends to soften at reaction temperatures (due to its reactivity with the support phase and formation of reactive/lower melting mono- and polymetalic oxide phases), which become sticky, and generally lead to particle agglomeration. Particle agglomeration, in fact, tends to increase as the amount of nickel present in the catalyst bed increases or as the Ni-containing phase is subjected to multiple oxidizing and reducing cycles as it is transported through the fluid bed.

Particle agglomeration is particularly increased by the high temperature, e.g., above about 2500° F., that occur when oxygen is introduced separately into the fluid bed. Thus, maintaining the level of nickel on catalyst at rather low levels, and avoiding exposure of the catalyst to high temperatures, minimizes particle agglomeration. On the other hand, sufficient nickel is required for providing economical feed conversions to synthesis gas, i.e., within about 250° F. approach to equilibrium, thereby minimizing the level of $CH_4$ exiting the syngas generation zone. It is a principal object of the present invention to provide an improved FBSG process which avoids the aforementioned disadvantages of conventional FBSG processes by operating under conditions which avoid high runaway oxidation temperatures and catalyst particle agglomeration, erosion, and dust formation, and enable the use of more active catalysts due to the reduction in severity of temperature and reduction-oxidation cycling experienced by the catalyst.

SUMMARY OF THE INVENTION

The present invention relates to a novel compact apparatus and an efficient fluidized bed syngas generation process for the partial oxidation and steam reforming of light hydrocarbon gases to convert such gases, such as methane, to valuable synthesis gas at moderate $H_2/CO$ ratios desired for subsequent hydrocarbon synthesis by forming a premixture or premix of the hydrocarbon and oxygen gases, and steam if desired, having the desired stoichiometric molar ratio of excess hydrocarbon gas to oxygen gas, and rapidly injecting and reacting the premix within the fluidized catalyst bed at relatively low temperatures which avoid thermal damage to the catalyst particles, such as agglomeration, fusion and dust formation. The essence of the present process involves providing pressurized sources of a light hydrocarbon gas containing $C_1$ to $C_4$ alkanes, such as methane, and oxygen or an oxygen-containing gas, preheating said gases, and injecting individual streams of said gases at high velocity and comparable momentums into admixture with each other to form a gaseous premix having a pressure reduction equal to at least 1%, preferably 3% and most preferably 5% or more compared to the lowest upstream pressure of either of the gas streams, and having the desired relative molar proportions, e.g., oxygen: carbon molar ratio of from 0.3 up to 0.8 to 1.0, preferably 0.45–0.70 to 1.0, at a plurality of mixing zones comprising injection nozzles or cups which are open to the fluidized bed reaction zone and are spaced over the face of an injector of the type used in the rocket or aerospace industry. The gas mixture preferably is injected within a maximum residence time within the mixing zones or injector nozzle cups less than its autoignition time, preferably less than 9 milliseconds, more preferably less than 2 ms and most preferably less than 1.0 millisecond, at a velocity between about 25 and 1000 ft/sec, preferably 50 and 500 ft/sec, and most preferably between 50 and 300 ft/sec, into the partial oxidation reaction zone comprising the fluid bed catalyst, so that the gaseous premix reacts before or simultaneously with the autoignition time delay of the mixture, to reduce the amounts of $CO_2$, $H_2O$ and heat produced by the partial oxidation reaction to favor the desired stoichiometry, i.e., $$2CH_4 + O_2 \rightarrow 2\ CO + 4H_2 + OH_2O - 5.7\ kcal/g\ mol\ CH_4.$$

The present process and apparatus represents an improved fluid bed syngas generation process (FBSG) by forming a premixture of the light hydrocarbon fuel gas and the oxidizing gas, and substantially reducing the delay time between the formation of the premixture of the preheated, pressurized reactant gases in the desired stoichiometric amounts and the introduction of the homogeneous gaseous premix to the fluidized bed catalytic reaction zone. The reduced delay time or duration of existence of the formed stoichiometric gaseous premix, prior to controlled reaction, avoids the problems of over-oxidation, as occurs in conventional FBSG processes where the oxygen reacts in an oxygen-rich zone near the oxygen injectors, catalyst sintering due to the high temperatures surrounding the oxygen injectors, and the dangers presented by the explosive nature of a preheated mixture of oxygen and methane gas.

The hydrocarbon gas stream introduced to the mixer/injector may contain components other than methane and $C_2$–$C_4$ hydrocarbons. For example, $H_2O$ and $CO_2$ may be present in the hydrocarbon gas in relatively large amounts, such as from about 0.0 to 1.0 mol of $H_2O$ or $CO_2$ per carbon atom of the light hydrocarbon gas. Other components, for example, $H_2$, CO, Ar, $N_2$, $NH_3$, HCN, $H_2S$, COS, $CS_2$, organic sulfur-containing compounds, organic oxygenates, and $C_5$+hydrocarbons may be present in lower concentrations, typically less than 0.10 mol of the component per carbon atom of the light hydrocarbon gas although higher levels may be present. The oxygen-containing gas stream introduced to the mixer/injector may likewise contain components other than oxygen. These components are typically $N_2$, $CO_2$, $H_2O$, and Ar. Some of these components, especially $N_2$, $CO_2$, and $H_2O$, may be present in major amounts, from 0.0 to 4.0 mol per mole of oxygen ($O_2$). Other components are typically present in lesser amounts, normally less than 0.1 mol of component per mole $O_2$.

It will be recognized by those skilled in the art, that the uniform gaseous premix formed when the hydrocarbon stream and the oxidant stream are ejected into the mixing zone or cup will not be perfectly mixed at the point of initial contact. In any real physical device, some time or distance will be required before mixing is achieved. As used herein, the term "feed stream" means the individual streams, such as hydrocarbon or oxygen containing gas, that are being fed to the mixing zone or feed nozzle cup, and the term "gaseous premix" means the physical combination of these feed streams in a state that is highly mixed. Of greatest importance in the present invention is that the streams achieve a high degree of mixedness in a minimum amount of time, and before gas phase or catalytic reactions begin to occur at any substantial level. In order to quantify this degree of mixedness, the measure "Efficiency of Mixing" abbreviated as $E_m$, is used.

$E_m$ is calculated from the composition profile of a stream of the gaseous premix. Composition profiles can be obtained by sampling the stream at many locations, or by use of other diagnostic tools. For example, imaging the Rayleigh-scattered light of a laser beam can, under properly controlled conditions, provide composition variations across partially mixed streams. The composition data is used to calculate how much of each feed stream is present at each location. For example, if one is mixing air with methane, the oxygen and nitrogen mole fractions would be combined to represent the mole fraction of the air stream.

For the case where hydrocarbon (abbreviated HC) and oxygen-containing (abbreviated OX) feed streams are being mixed, we defined $E_m$ using the following equation:

$$E_m = ((X_{HC}/X_{OX})_{MIN}/(X_{HC}/X_{OX})_{MAX})^{0.5}$$

Where $X_{HC}$ and $X_{OX}$ represent mole fractions in the gaseous premix of hydrocarbon gas and oxygen-containing gas, and the subscripts "MIN" and "MAX" designate that these are the minimum and maximum ratios found in the stream. Thus, $(X_{HC}/X_{OX})_{MIN}$ represents the minimum HC/OX mole fraction ratio found in the composition profile. As so defined, $E_m$ reaches a value of 1.0 when the gases are perfectly mixed, and will have a value of 0.0 if the stream has any locations that are completely unmixed (has a location where the composition is equal to that of either feed stream).

In the practice of the present invention, the gaseous premix achieves a high degree of mixedness, quantified as $E_m$, in a minimum amount of time. We define this rate of achieving high mixedness by specifying the distance downstream of the injector at which a given $E_m$ level will be attained. Because injector sizes may vary greatly, and because mixing distances tend to scale linearly with injector size, we define the distance downstream of the injector in proportion to a critical nozzle dimension. In articular, we define L as the distance downstream from the point of initial contact between the gases, adjacent the floor of the mixing nozzle, and we define D as the diameter or similar dimension of the largest orifice through which either feed stream is introduced into admixture in the nozzle. $D_{AX}$ is the diameter of the exit orifice feeding the gas stream that is most axial with the gaseous premix path, or most near the center of the injector or as the stream being introduced in the fewest number of orifices within the nozzle. It is preferred that mixing nozzles be used in the present invention that achieve and $E_m > 75\%$ at a distance downstream of $L/D_{AX}$ up to about 10, generally between 1. and 6. It is more preferred that nozzles achieve $E_m > 80\%$ at this distance, and most preferred that nozzles achieve $E_m > 90\%$ at this distance downstream.

An important parameter defining the effectiveness of mixing is the "momentum ratio" of the streams being mixed. The momentum of a stream is defined as the product of the velocity of a stream as it is injected into the mixing zone multiplied by the stream's mass rate. For efficient mixing the ratio of the momentums of the mixed streams should be comparable. Poor mixing performance can occur if momentums of the streams are disparate. In the case of a mixing nozzle with axial injection of oxygen-containing gas and radial—or somewhat radial—injection of hydrocarbon gas, the ratio of the momentum of the hydrocarbon gas to the momentum of oxygen-containing gas is preferably in the range of 0.5–4.0 most preferably from 1.0–3.0. For the opposite case of axially-injected hydrocarbon gas and radially—or somewhat radially—injected oxygen-containing gas, the ratio of the momentum of the hydrocarbon gas to the momentum of oxygen-containing gas is in the range of 0.25–2.0, preferably from 0.33–1.0. It is understood that if a gas is injected in more than one stream into a mixing chamber then the sum or the momentums, or summed momenta, of all of the streams of the particular gas is used in the calculation of the momentum ratio.

The present process and apparatus enables the partial oxidation and steam reforming reactions to be completed while the gaseous premix is in contact with the catalyst as a homogeneous and stoichiometric mixture, since uniform gaseous premixes are formed at and ejected from the plurality of ejector nozzles which are distributed over a wide diameter injector face corresponding to the wide diameter entry face of the fluidized bed reactor, thereby avoiding the introduction of oxygen-lean or oxygen-rich gas mixtures, which can interfere with the desired stoichiometric reaction and can result in hot spots which can burn or sinter and agglomerate the catalyst.

The present multi-orifice, large diameter injectors operate at extremely high speeds, up to sonic speeds, and discharge the separate gases, e.g., methane and oxygen, in a predetermined ratio from closely-spaced orifices, i.e., within up to about 0.5 inch of each other, into direct contact with each other within a plurality of small mixing recesses or cups at the injector surface, or at an angle of from about 60° up to about 180° relative to each other for intersecting contact or impingement and admixture immediately above the injector surface, for discharge or injection of the homogeneous preheated pressurized mixture into the fluidized bed reactor at high speeds. The dwell time of the gas mixture within or immediately above the injector surface prior to injection into the reaction zone is less than about 9 milliseconds after the mixture is formed, preferably less than about 2 milliseconds, and most preferably less than 1.0 millisecond, to substantially avoid undesirable gas phase reactions upstream of the catalyst zone. Also the velocity of the homogeneous gas mixture as it is ejected from the mixing nozzles is from about 25 to 1000 ft/sec, more preferably between about 50 to 500 ft/sec and most preferably between about 50 and 300 ft/sec, whereby efficient syngas production is enabled by compact reactors of higher throughout than heretofore possible.

As used herein, references to the velocity at which the gaseous premix is passed to the partial oxidation zone should be taken to mean the local gas velocity as the gaseous premix leaves the mixing nozzles, and not some reactor-average superficial velocity.

Another critical feature of the present high speed gas mixers/injectors is that they are designed to produce a drop or reduction of the initial gas pressure into the mixer/injector which is more than 1%, preferably more than 3%, and possibly more than about 5% lower than the lowest upstream gas pressure ($P_u$), relative to the gas pressure within the inlet of the reactor ($P_c$), which pressure is normally between 10 and 100 atmospheres, preferably between about 20 and 50 atmospheres, i.e., the pressure reduction, or $\Delta P$, equals $P_u - P_c$ divided by the reaction chamber pressure or Pc, and is $>1\%$, preferably $>3\%$ and possibly $>5\%$. This pressure drop causes the oxidation gas and the hydrocarbon gas to be drawn into more intimate admixture immediately in advance of injection into the reaction chamber, to form the desired stoichiometric gaseous premix containing between 0.3 and 0.7 mols of oxygen ($O_2$) per mol of methane, which has a single carbon atom, or per mole of carbon in a light hydrocarbon gas, excluding carbon monoxide or carbon dioxide. The pressure drop also improves the uniformity of flow of the gases through the mixer/injector to avoid instabilities. This is particularly important in the case of economically advantageous, very large reactors which employ a plurality of side-by-side mixers/injectors to supply the gaseous premix to the large-diameter catalytic reactor. The pressure drop as the gases pass through the injector results in a high gas mixing efficiency ($E_m$) as close as possible to the face of the injector to produce the gaseous premix having the desired stoichiometry prior to reaction and immediately in advance of the injection of the mixture into the fluidized catalyst bed. The desired ratio of the hydrocarbon gas and the oxygen gas always has an excess of the hydrocarbon to prevent over-oxidation, excessive heat and soot formation. In cases were the mixing nozzles of the injector are cups or wells recessed below the face surface of the injector, the point of 80% to 90% $E_m$ occurs at a location (L) which depends upon the diameter (D) of the largest gas orifice to the cup or well, i.e., $E_m$ occurs at a L/D of 10 or less, such as 1 or 2. As mentioned, this mixing efficiency is enabled by the uniform pressure drop, or $\Delta P$, as the gases pass through the isolated small passages of the manifold of the injector means and through the nozzle orifices to impinge at each of the mixing zones, nozzles or cups, and the uniformity of the pressure drop assures uniform continuous gas supply to each of the mixing nozzles or cups even when a plurality of the injectors means are assembled side by side and fed through common gas conduits to feed very large diameter reactors.

The present apparatus enables a partial oxidation reaction that is fed by a more homogeneous or uniform supply of reactant gas premix composition. Because the feed gas is a mixture of hydrocarbon and oxygen-containing streams that is very reactive, particularly reactive at the high pressures and temperatures desired for syngas generation, the time available to mix the gases before introducing them into the partial oxidation zone is very limited. Thus, we have discovered that feed injectors that achieve high levels of $E_m$ in very short physical distances—distances on the order of inches, not feet, achieve high $E_m$ in short $L/D_{AX}$ wherein $D_{AX}$ is the diameter of the axial stream orifice, usually the oxygen gas orifice and L is the distance downstream from the point of initial contact between the gases, such as the lowest level of the radial gas orifices, adjacent the cup floor containing the axial gas orifice. However, for the large scale reactors of commercial interest, use of single injectors would require a large $D_{AX}$ at any reasonable injector velocity, and so achieving high $E_m$ in a short $L/D_{AX}$ is not sufficient. Thus a critical feature of this invention is the use of an injector having a plurality of mixing nozzles or chambers or cups, which serve to reduce the injector dimensions (reducing $D_{AX}$) and reduce the physical distance (and hence time) required to achieve a gaseous premix having a high degree of feed uniformity.

Finally, the use of a plurality of injector nozzles presents the problem that multiple nozzles can interact and become unstable, and also presents the problem that multiple injector nozzles must all be fed at the same stoichiometry. Thus, a third key feature of this invention is the use of an elevated pressure drop of more than 1% for the gaseous premix from the nozzles to provide uniform, stable, and non-interacting flows of admixed streams into the partial oxidation zone.

DETAILED DESCRIPTION OF THE DRAWINGS

Figure 1:
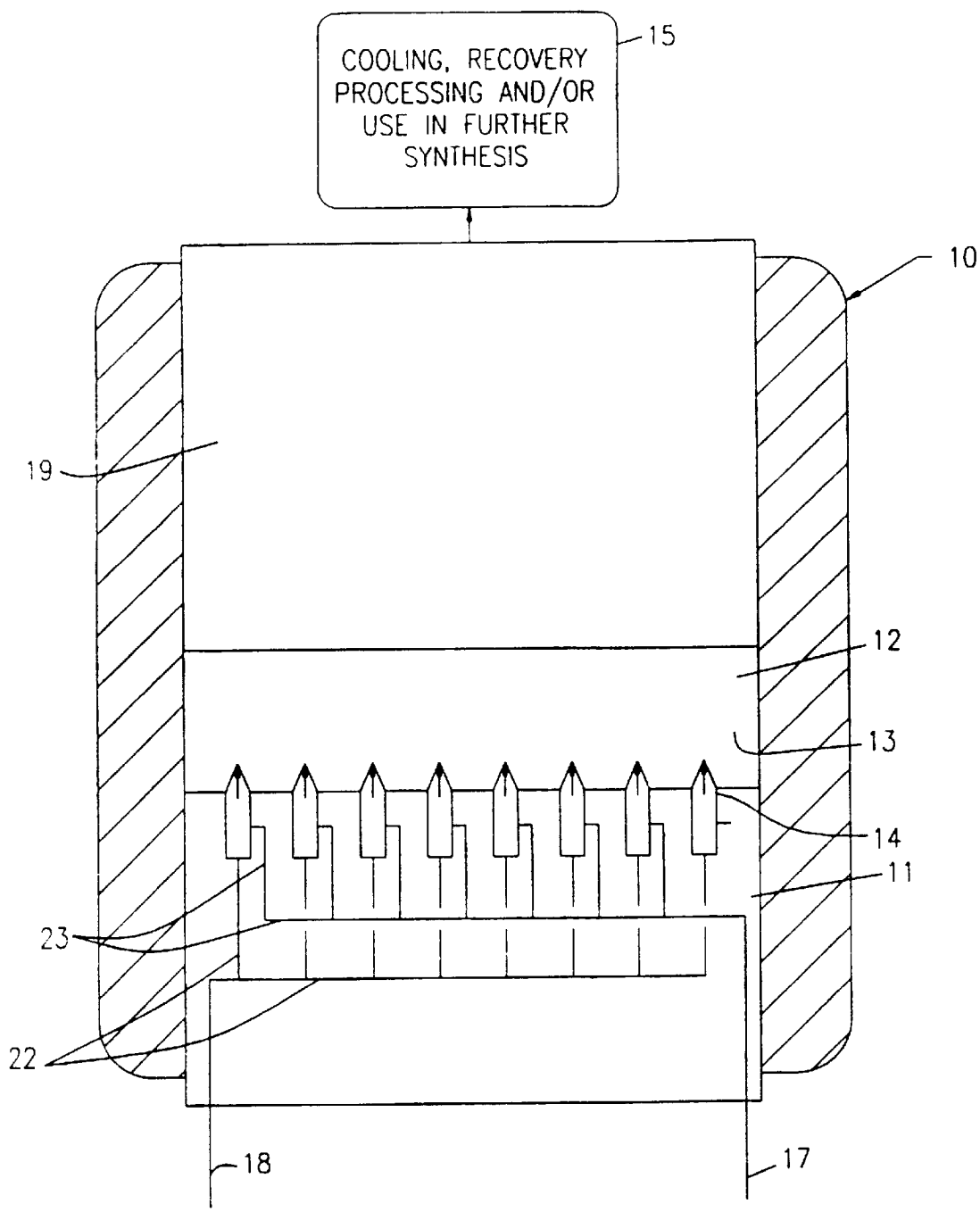
FIG. 1 is a diagrammatic illustration of an upfacing injector fluid bed reactor apparatus according to one embodiment of the present invention.

Referring to FIG. 1, the upfacing gas-injector/fluid bed catalyst reactor apparatus 10 thereof comprises an assembly of a lower multi-jet, face-mix gas injector means 11, an upper reaction chamber comprising a fluid bed 12 of catalyst at the support or inlet face surface 13 of the injector means 11 and a downstream overhead reaction zone 19 leading to a syngas cooling and recovery means 15. The plurality of jet nozzles or cups 14 at the face surface 13 of the injector means 11 discharge directly into the fluid bed 12 of catalyst to assure the uniform injection of a homogeneous gaseous premix of methane and oxygen, in the desired predetermined oxygen ($O_2$)/carbon ($C_1$) molar ratio of from about 0.3 up to 0.8 to 1.0 mole of (C) preferably 0.45–0.7 to 1.0 and synthesis gas is recovered in area 19.

Separate methane supply conduit 17 and oxygen supply conduit 18 feed continuous streams of preheated, pressurized methane and oxygen into and upwardly through the manifold methane passages 23 and oxygen passages 22 for intermixing within the plurality of jet nozzles or cups 14 at the face surface 13 of the injector means 11 or for angular impingement immediately above the face surface 13 of the injector means 11. The methane passages 23 and oxygen passages 22 have exit orifices sized so that the pressure of the gas as it passes through these passages and orifices is reduced to a pressure that is more than 1% lower, preferably more than 3% lower, and possibly more than 5% lower than the lower of the upstream pressures in the methane conduit 17 or the oxygen conduit 18. This ensures even distribution of methane and oxygen to the plurality of jet nozzles or cups 14, ensuring that each jet nozzle or cup has the same oxygen/carbon ratio, which uniformity eliminates local hot spots, local carbon deposition, and reactor instabilities.

It is preferred that the jet nozzles or cups 14 are sized so that the gas residence time of the mixture in the injector is substantially less than the autoignition delay time of the mixture, and preferably less than 9 milliseconds, more preferably less than 2 millisecond, and most preferably less than about 1.0 millisecond. This prevents reaction of the gaseous premix in the gas phase within the injector means 11, and/or out of contact with the catalyst, which reaction would proceed with excessive heat generation that is damaging to the catalyst and syngas reactor.

The injection of the present pre-heated and pressurized light hydrocarbon and oxygen gases into admixture in the desired proportions to form the gaseous premix having a reduced pressure which is more than 1% lower, preferably more than 3% lower, and possibly more than 5% lower than the lowest upstream pressure of either of the gases, into the inlet of the reaction zone within a time period equal to or shorter than the autoignition time period thereof, preferably less than 9, 2, or 1.0 millisecond is the essence of the present fluid bed syngas generation (FBSG) process. The present process enables the reduction of reactor size and the reduction of catalyst agglomeration by pre-forming the desired gaseous premix of the gases before injecting the homogeneous gaseous premix into the fluidized catalyst bed 12 within the reaction zone of the reactor.

It is highly advantageous for safety reasons when using pre-heated and pressurized feeds, to inject or blow the homogeneous gaseous premix into the fluidized catalyst reaction zone immediately, for immediate controlled reaction since the gaseous premix is pre-heated, pressurized, homogeneous and has the desired stoichiometry for the most desirable syngas formation.

Figure 2:
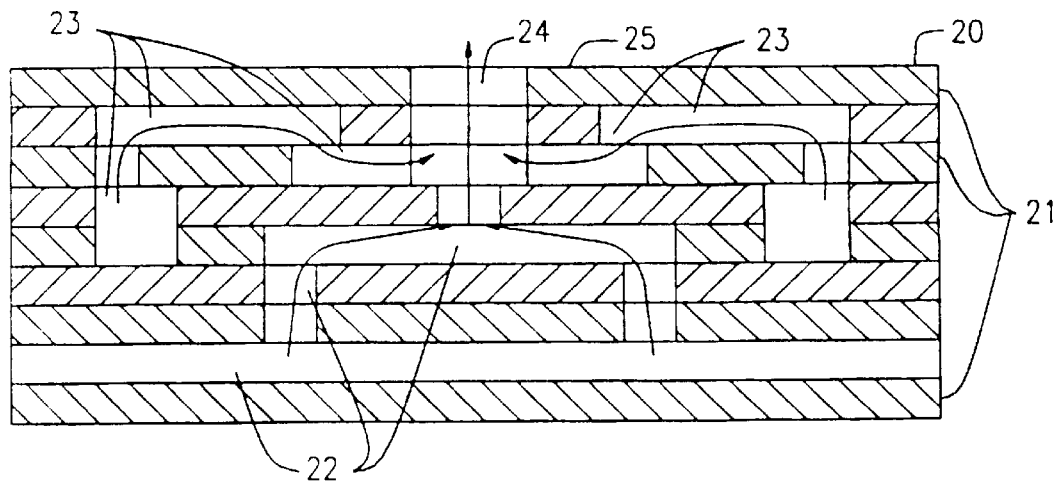
FIG. 2 is a cross-sectional side view of a single nozzle section of a multi-jet injector useful in association with a syngas reactor according to the present invention.
Figure 3:
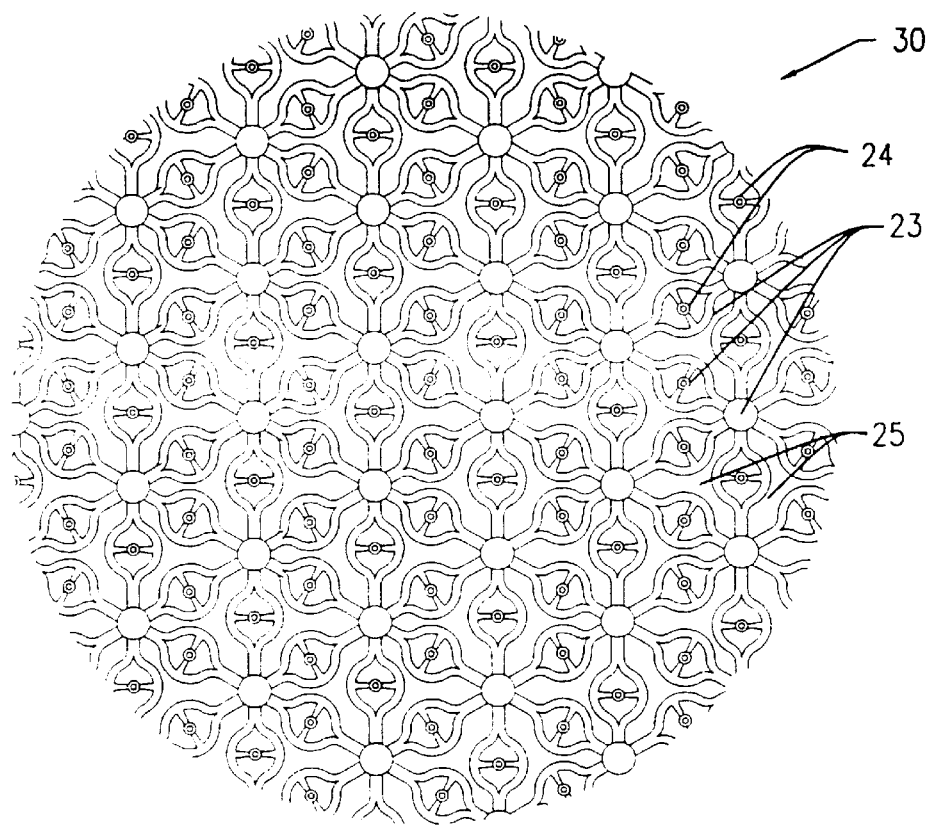
FIG. 3 is a plan view of the face and certain channels beneath the face surface of a multi nozzle injector as illustrated in FIG. 1.

Suitable feed injectors that meet these criteria have been developed for use in the aerospace industry. One such device is called a microinjector or platelet burner. The principal of this injector is that many small mixing nozzles or cups are uniformly-spaced over the large diameter face of the injector and are supplied with the individual gases through separate passages in a manifold of the injector for admixture in the nozzles or cups or in an impingement area immediately above the face of the injector. Any such mixing approach can be used in the nozzles, but some will be more amendable to fabrication and to rapid mixing. A preferred approach is the use of nozzles called "triplets", in which there is a central or axial flow of one reactant, such as oxygen, through the oxygen passages of the manifold and into each recessed nozzle cup, and the second reactant such as methane is introduced to the cup in at least two opposed or intersecting jets up to about 1 inch below the injector face. An advantage of this triplet design as applied to the present process is that is has very good anti-flashback properties, which are highly desired for hot, high pressure $CH_4/O_2$ mixing. FIGS. 2 and 3 illustrate such an injector, injector face, and suitable triplet mixing nozzles or cups.

Injector 30 faces of the type shown in FIG. 3 can be built in large diameters, with spacing of the mixing nozzles or cups 24 smaller than 1". Thus, to achieve homogeneous reaction mixtures, mixing lengths and residence times are kept very low. A preferred embodiment for a fluidized bed reactor is a design in which the width of the injector face corresponds to the width of the partial oxidation reactor 10 and of the fluidized catalytic bed therewithin, and the nozzles or cups 14 are uniformly spaced over the injector face 13. In this case, no volume of the fluid bed will be left unfluidized.

A preferred high velocity mixing injector means 20, developed for use in the aerospace industry, is illustrated by FIG. 2 of the present drawings and is illustrated by FIGS. 3–6 of U.S. Pat. No. 3,881,701, the disclosure of which is hereby incorporated herein by reference thereto. The platelet-type injectors of this Patent are produced by forming fine fluid-flow methane and oxygen passages on the surfaces of or within a plurality of thin plates 21 containing interconnecting bores in predetermined areas, and bonding the plates together to form injectors having manifolds containing fine isolated gas passages 22 and 23 for oxygen and methane, which passages communicate at a plurality of microjet nozzles or cups 24 at a face surface 25 of the injector or impinge immediately above or beyond the injector surface, to mix the gases and eject the mixtures at high velocity. The present injectors are gas delivery manifolds which are engineered to provide equal specified flow to all nozzles or cups 24.

Thus, the injector 20 of FIG. 2 comprises a plurality of thin metal plates 21 which are diffusion-bonded to each other after being provided in predetermined areas thereof with segregated oxygen passages 22 and methane passages 23 respectively, which communicate with sources of oxygen and methane, respectively, under high temperatures and pressures. The passages 22 and 23 divide the total flow of the individual gases into a very large number of precisely-metered, very small streams of the individual gases, which streams communicate within or immediately above a plurality of mixing nozzles or cups 24 which are open at the face surface 25 of the injector 20.

The injector means 20 of FIGS. 2 and 3 isolates the heated, pressurized streams of the methane and oxygen gases until they mix within the plurality of cups 24 and are injected upwardly as a gaseous premix at high velocity of 25 to 1000 ft/sec, more preferably 50 to 500 ft/sec., most preferably 50 to 300 ft/sec., with a pressure drop greater than 1%, preferably greater than 3%, of the lowest upstream pressure, compared to the pressure within the inlet to the fluidized bed reaction zone. The gaseous premix is injected directly up into the reaction chamber and into the fluidized bed of reforming catalyst for reaction in the presence of the catalyst.

A further advantage of the manifold injectors of FIG. 2 is that one or both gases can be used to cool the face surface 25 of the injector 20 by heat exchange therewith to prevent heat damage thereto due to the proximity to the reaction zone which has a temperature between about 700°–1650° C., preferably between 870°–1320° C. This cooling is accomplished by the circulation of the gas or gases preheated to feed temperatures of 100°–700° C., preferably between 300° and 600° C., through circulation passages, such as 23, immediately below the uppermost plate 21 forming the face surface 25 of the injector 20 to cool the face surface 25 well below the reaction temperature, such as 1000° C., within the reaction zone as the gas or gases pass through the manifold to the mixing cups 24 to form the gaseous premix.

In a preferred embodiment of the present invention, the catalyst fluid bed 12 is one comprising an admixture of particulate metal oxide, as a carrier material, in concentration ranging from about 10 percent to about 99.9 percent, based on the total weight of the admixture, and a catalyst of average particle diameter ranging from about 30 microns to about 150 microns, preferably from about 60 microns to about 90 microns, in concentration ranging from about 0.1 percent to about 90 percent, based on the total weight of the admixture. Preferably, the catalyst is constituted of a support, or carrier, such as a refractory inorganic oxide, particularly alumina, with which is composited a metal, or metals, e.g., nickel, iron, platinum, ruthenium or the like, catalytic for the production of hydrogen and carbon monoxide from low molecular weight hydrocarbons contacted with a fluidized bed of the catalyst at high temperature hydrothermal conditions, suitably a nickel-on-alumina catalyst, and preferably a nickel-on-alpha alumina catalyst, of particle size distributions corresponding to that of the metal oxide. An admixture constituted of from about 10 percent to about 99.9 percent, preferably from about 80 percent to about 99.5 percent, of said precalcined particulate metal oxide solid, and from about 0.1 percent to about 90 percent, preferably from about 0.5 percent to about 20 percent of the catalyst, based on the total weight of the admixture (dry basis), can be fluidized at temperatures ranging to about 1650° C., particularly at temperatures ranging between about 870°–1320° C., and contacted with a low molecular weight hydrocarbon, e.g., $C_1$ to $C_4$ alkanes, predominantly methane, in the presence of steam, or oxygen (air), or both steam and oxygen (air), to produce syngas without significant sintering of the particulate metal oxide or catalyst components of the admixture. Likewise, there is no significant disintegration of either component of the admixture to fines, or degradation of the particles of the admixture to produce agglomerates.

The reaction of the gaseous premix within the partial oxidation zone 12 requires means to cause the initiation of the reactions. Suitable means to initiate reaction in a gaseous partial oxidation zone include heating of the zone, as well as the introduction of a spark, plasma, or hot glow plug into the zone. Suitable means to initiate reaction in a catalyst-containing partial oxidation zone may include the above methods, but will more preferably be accomplished by preheating the catalyst to at least the low end of the catalytic partial oxidation temperature range, which temperature range begins at about 700° C. Such preheating can be accomplished, for example, by directing a flow of hot combustion gases through the catalyst, as is known in the art.

Referring to FIG. 2, it is preferred for use with a fluidized bed reactor that the depth of the cup 24 of FIG. 2 be increased in order to deter entry of loose or eroded catalyst particles or catalyst dust down into the cup 24 and stop erosion of the cup by such particles. FIG. 2 illustrates a cup 24 which may have a diameter of about 0.10" and a depth of about 0.10" which may be doubled to an extended depth of about 0.20", for example. The methane gas inlets 23 are split inlets each having an exit orifice having a width W of about 0.05" which inject hot pressurized methane gas flows horizontally from opposed sides of the cup 24 radially against the vertical or axial flow of hot pressurized oxygen gas introduced through the central inlet 22 having an exit orifice diameter of about 0.06", for example to form the homogeneous reactant gaseous premix which is ejected upwardly from the cup 24 in less than 9 milliseconds, preferably less than 2 ms, most preferably less than 1.0 ms.

Figure 4:
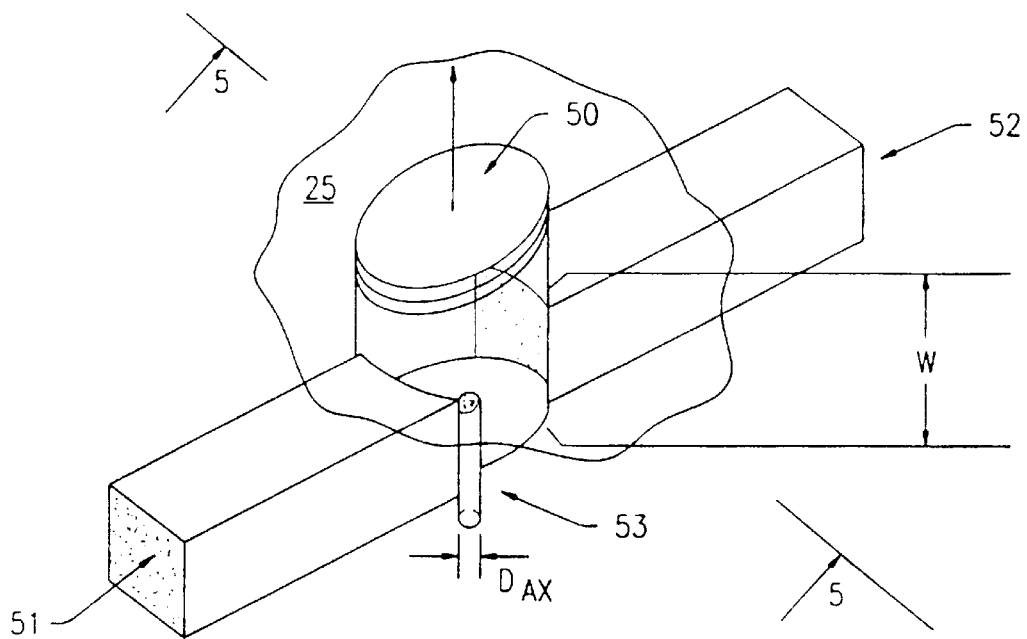
FIG. 4 is a perspective view of an individual injector mixing nozzle as present in the multi-nozzle injector of FIG. 2, according to one embodiment of the present invention.
Figure 5:
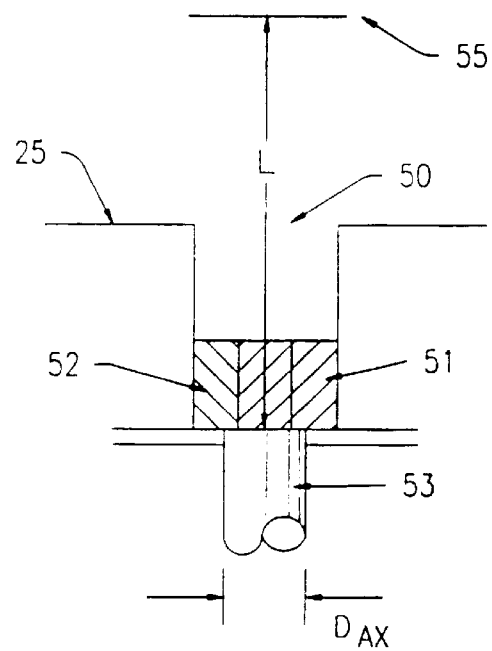
FIG. 5 is a cross-sectional view taken along the line 5—5 of FIG. 4.

FIGS. 4 and 5 illustrate an individual triplet mixing nozzle or cup 50 as an alternative design for the cup 14 of FIG. 1 or for the cup 24 at surface 25 of FIGS. 2 or 3. Referring to the nozzles 50 of FIGS. 4 and 5, the horizontal methane supply conduits 51 and 52 thereof each have an exit orifice width W of about 0.30", and are slightly offset relative to each other, as illustrated in FIG. 5, so that the methane gas flows therefrom, horizontally and tangentially against the vertical oxygen gas flow through central vertical oxygen conduit 53 having an exit orifice diameter $D_{AX}$ of about 0.30", to cause the gas mixture to swirl within the mixing cup 50 as the gaseous premix is formed and ejected in less than 9 ms. The mixing cups 50 of FIGS. 4 and 5 are illustrated with a cup depth of about 0.5 inch and a cup diameter of about 0.5 inch. Extending (e.g., doubling) the cup depth to about 1 inch results in a more preferred injector design for FBSG. The deeper injector nozzles are more resistant to fouling, and thus are preferred to the extent that residence time limits within the injector nozzles are not exceeded. When injectors are tested in the absence of catalyst, the gaseous premix ejected from the mixing cup 50 can be characterized for mixedness $E_m$ in a plane 55 located a distance L downstream of the point of impingement of the gases. Preferred injectors achieve $E_m$ >75%, more preferably >80% at downstream distances L<10 $D_{AX}$, more preferably between 1 and 6.

Figure 6:
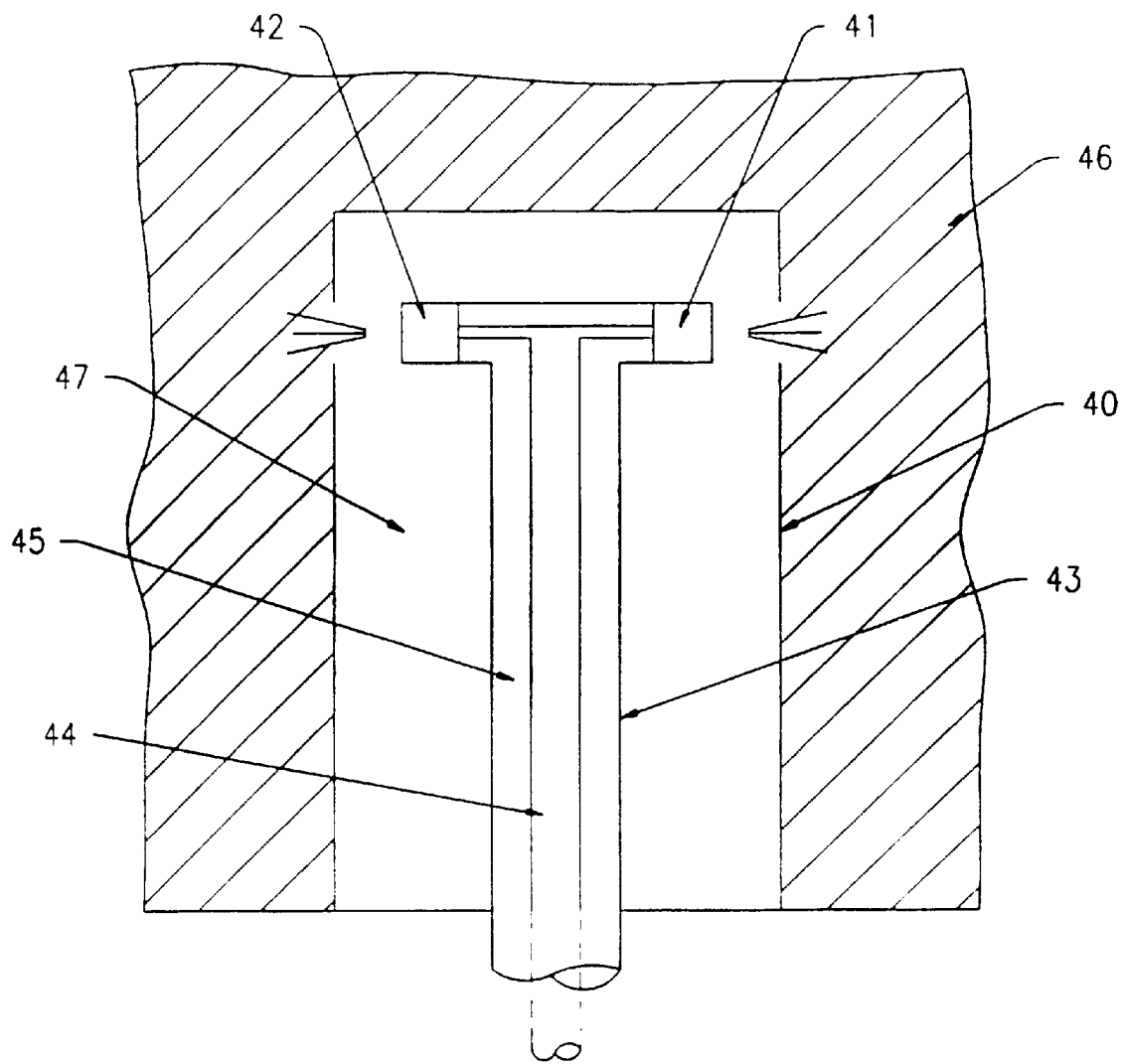
FIG. 6 is a diagrammatic illustration of a side-facing fluid-bed injector apparatus illustrating placement of one of a plurality of mixing nozzles within posts that rise up from the floor into an area of the fluid bed to permit side-facing or downward-facing injection of the gaseous premix.

In the embodiment illustrated by FIG. 6, the injector stand or element 40 thereof is one having a plurality of extended microinjector means, such as 41 and 42, which are fed by a common coaxial gas conduit 43 having a central oxygen gas supply pipe 44 and an outer methane gas supply pipe 45. The injector element 40 comprises a sheath of refractory insulation 47 and extends upwardly into the interior of the reactor and into the lower stratum of the fluidizable catalyst bed 46 so that the microinjector means 41 and 42 inject the gaseous premix of oxygen and methane from mixing nozzles at the face surface thereof horizontally or downwardly, at an angle of from about 0° to 90° down from horizontal, into the fluidized catalyst bed 46 to produce the partial oxidation and steam reforming reactions. The injector means 41 and 42 may be of the manifold design illustrated by FIGS. 2 to 5, and a larger number of microinjectors may be present on and fed by each coaxial gas conduit 43. Also, it will be obvious that a plurality of such injector elements 40 can be present depending upon the diameter of the fluid bed reactor. In a preferred embodiment, the injector means 42 and 41 are angled downwardly to deter entry of catalyst particles into the mixing cups or nozzles.

It will be apparent to those skilled in the art that the specific dimensions of the present nozzles or cups can be varied depending upon the dimensions of the reactor being used in association with the injector, and the size of the latter. For example the tubular cup 24 of FIG. 2, preferably cylindrical, can have a maximum diameter up to about one inch, preferably up to about one-half inch, and a maximum depth, down to the methane inlets, which is also up to about one inch. At these maximum dimensions, the diameter or width of the oxygen inlet conduits 22 and of the methane inlet conduits 23 will be larger in order to provide sufficient gas volumes and pressures to maintain a methane-to-oxygen ratio which is greater than 1, to avoid over oxidation, especially $CO_2$ formation, in all areas of the reactor.

Figure 7:
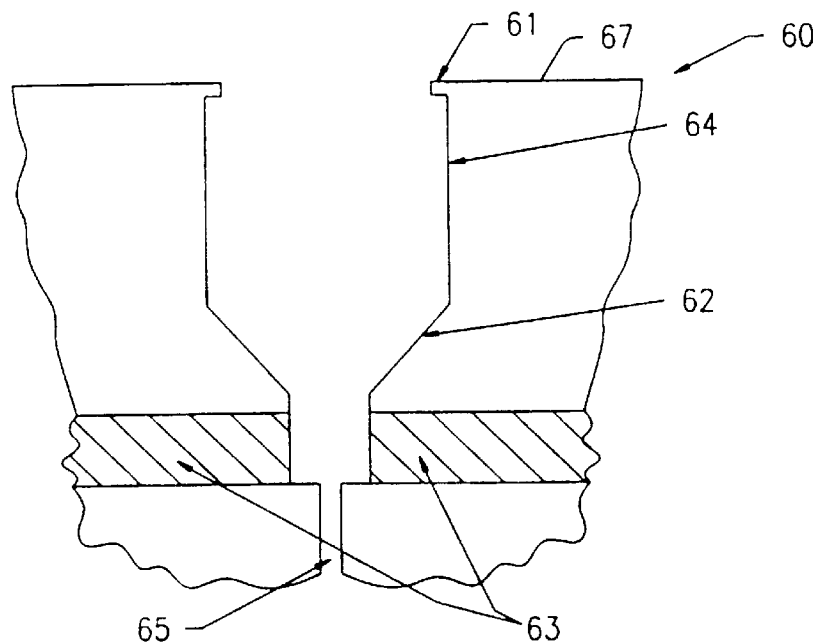
FIGS. 7 and 8 are cross-sectional side views of single nozzle sections of multi-jet injectors useful in association with a syngas reactor according to other embodiments of the present invention.
Figure 8:
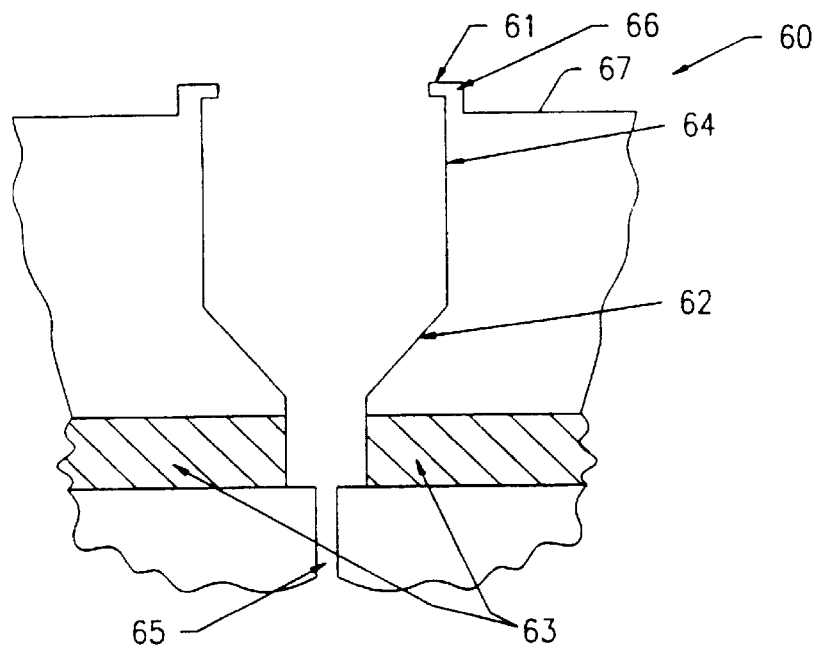

FIGS. 7 and 8 illustrate preferred injectors 60 in which the plurality of injector nozzles or cups 64 are provided with boundary layer disrupter means such as a narrow radial flange or lip 61 and/or a short tubular axial extension neck 66 and/or a bottom funnel or conical taper wall 62, and/or an overall or partial protective layer of erosion-resistant composition which protects the upper surface 67 and/or the inside surface of the cup, including the taper wall 62.

The preferred embodiment of the FBSG injector incorporates several features, many of which serve to reduce erosion caused by the fluidized bed solids. First, the flow of gaseous premix exiting from the mixing cup 64 should be substantially uniform with no zones of fluid recirculation back into the cup. Such zones cause solid particles to flow into the injector with erosion as the result. Two preferred embodiments ensure uniform exiting flow. The radially directed streams may be partially offset as shown in FIGS. 4 and 5, introducing a swirling component to flow, The swirling components cause the flow to uniformly fill the mixing cup cross-section, thereby preventing the formation of fluid recirculation zones. The preferred ratio of swirled fluid angular momentum to axial fluid linear momentum is 0.2 to 1.6. The most preferred range is 0.5–1.0. The other method is to extend the length of the mixing cup to allow development of the flow. As the flow develops, it tends to more uniformly fill the cross-section of the mixing cup, also avoiding recirculation zones. The preferred ratio of mixing cup length to mixing cup diameter is in the range of 1.0–2.0. The most preferable embodiment is a combination of these features.

In spite of efforts to provide uniform flow and to avoid fluid recirculation zones, some solids can enter the mixing cup 64 along the fluid boundary layer which forms on its inside surface. A slight reduction of the mixing cup diameter just prior to its discharge, as illustrated by lip 61 in FIGS. 7 and 8, serves to disrupt the boundary layer. This reduces the tendency for solids to fall along the boundary layer into the mixing cup. The diameter reduction needed is small, on the order of 5% or less of the nominal mixing cup diameter. The axial length of the reduced diameter zone, or the thickness of lip 61, can likewise be as short as practical, on the order of 0.010–0.050 inches. A suitable boundary layer disrupter flange or lip 61 is illustrated in FIGS. 7 and 8.

Particles may still enter the injector due to fluid bed pressure fluctuations or process upsets. To prevent erosion, these particles should be ejected from the mixing cup quickly. Referring to FIGS. 4 and 5, the bottom of the mixing cup 50 thereof is shown as a flat surface which intersects the wall of the mixing cup at approximately a right angle. This geometry may cause the formation of internal recirculation zones where particles can remain for some time, resulting in erosion along the walls and the edge of the bottom of the mixing cup along the cup wall. A preferred arrangement is to taper the bottom of the mixing cup from the axial fluid inlet 65 to the mixing cup wall, shown as taper 62 in FIGS. 7 and 8. A typical taper angle is on the order of 100–120°. Such tapering prevents the formation of internal recirculation zones and promotes ejection of particles from the mixing cup 50. Additional resistance to erosion at the bottom of the mixing cup 50 can be attained by coating the bottom and/or inside surface of the cup with an erosion resistant material, in the same fashion as described below for the injector surface.

Erosion of the top surface 67 of the injector means 60 of FIGS. 7 and 8 can be reduced by either coating the top surface 67 with an erosion resistant material or by extending the mixing cup 64 in the form of a short tube 66 above the injector surface 67, as shown in FIG. 8. If an erosion resistant material is used, it should be bonded to the injector surface, and should possess properties so that it will remain tightly bonded to the surface after repeated thermal cycling of the injector. Ideally, the thermal expansion of the erosion resistant material should match that of the material of construction of the injector. In the case where the injector is made of metal, metal bonded erosion resistant coatings such as nickel-chrome chromium carbide are useful. The erosion resistant material may be applied by any means known in the art, such as, plasma torch spraying, high velocity torch spraying, detonation coating, etc. If an extending mixing cup 64 is used, it should extend a short distance above the injector surface, as shown at 66 of FIG. 8. The distance the mixing cup is extended should be less than one mixing cup diameter. The function of the extension 66 is to allow fluid bed solids to rest on the injector surface, preventing contact between the surface and the moving fluid bed particles. This effectively prevents surface erosion. It also has the benefit of providing some measure of thermal isolation of the injector surface 67 from the hot fluid bed.

Also, it is essential to maintain a pressure reduction of the lowest upstream gas pressure ($P_u$) through the injector which is greater than 1% or 3%, and possibly greater than about 5% relative to the gas pressure within the inlet of the reactor ($P_c$), i.e., $\Delta P/P_c$ is equal to $(P_u-P_c)/P_c$ and is greater than 1%, preferably greater than about 3% where $P_u$ is the lowest upstream feed gas pressure, $\Delta P$ is the pressure drop through the injector and Pc is the reaction chamber inlet pressure. The upper limit of this value can become impractical high as the flow velocity through the injector approaches sonic. Generally the flow velocity is maintained within practical limits for economic reasons and to avoid or reduce particle attrition in fluidized catalyst beds, and erosion.

According to a further embodiment of the present invention, the formed useful syngas is cooled, recovered and treated for use in further synthesis processing. Such treatment may include purification to remove the low amounts of ammonia and hydrogen cyanide produced in the partial oxidation process. Suitable processes for removing ammonia and hydrogen cyanide from gaseous streams are well known in the art. The removal of ammonia and hydrogen cyanide may be effected in a single stage or in a plurality of stages. The cooling step may be effected before or after the purification treatment steps, as appropriate to accommodate preferred temperatures of the treatment process. Small amounts of hydrogen may be separated out of the syngas for use in hydrocarbon upgrading stage.

The treated syngas may be used in processes that produce methanol and methanol based products, hydrocarbon synthesis (HCS) products such as liquid hydrocarbons, olefins, alcohols and aldehydes, oxo-synthesis products, ammonia and ammonia based fertilizers and chemicals, town gas or reduction gas used for the production of sponge iron, etc.

In a conventional hydrocarbon synthesis (HCS) process, liquid and gaseous hydrocarbon products are formed by contacting the present syngas comprising a mixture of $H_2$ and CO with a suitable Fischer-Tropsch type HCS catalyst, under shifting or non-shifting conditions. Suitable Fischer-Tropsch catalysts comprise, for example, one or more Group VIII catalytic metals such as Fe, Ni, Co, Ru, and Re. In one embodiment, the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for cobalt-containing catalysts comprise titania, particularly when employing a slurry HCS process in which higher molecular weight, e.g., $C_{10+}$ products, primarily paraffinic liquid hydrocarbon products are desired. The hydrocarbon products produced by an HCS process according to an embodiment of the present invention are typically upgraded to form suitable products such as, synthetic crude oil, liquid fuels (e.g., jet and diesel), a lubricating, industrial or medicinal oil, waxy hydrocarbons, olefins (by, e.g., catalytic cracking or steam cracking). These processes are well known to those skilled in the art and need not be described here. All or a portion of the HCS products can be fractionated and then converted in one or more steps with or without a suitable catalyst or in the presence of hydrogen or both. Hydroconversion is usually preferred and includes mild hydrotreating (minimal branching) to make pumpable liquids, hydroisomerization (somewhat more branching, e.g., 25–65%, and preferably mono-methyl branching) for making distillates such as jet fuels and diesel fuels, and more severe hydroisomerization (wherein virtually none, e.g., less than 10 wt % and preferably less than 5 wt % of the feed remains unconverted) to make lube oils. These processes are also well known and reported in the literature in so far as catalysts and reaction conditions are concerned.

The foregoing description is only illustrative of the invention. Accordingly, the present invention is intended to embrace all alternatives, modifications and variances which fall within the scope of the appended claims.

What is claimed is:

1. A fluidized bed syngas process for the partial oxidation and steam reforming of hydrocarbon gas to $H_2$/CO-containing synthesis gas, comprising providing individual streams of a hydrocarbon gas and oxygen or an oxygen-containing gas, each stream being at independent elevated temperatures and a pressure of 10–100 atmospheres, the phrase "at least one of said individual streams also comprises steam", injecting said individual streams at high velocities into admixture with each other through an injector means having a plurality of mixing nozzles and having separate passages for the hydrocarbon gas and the oxygen or oxygen containing gas, the pressure drop in the passages being at least 3% of the lowest upstream pressure of either of said gases, passing the resulting gaseous premix from the plurality of mixing nozzles within a time period shorter than its auto-ignition time into a catalytic fluidized bed reaction zone to produce said $H_2$/CO-containing synthesis gas, and recovering said synthesis gas.

2. The process of claim 1 in which said fluidized bed reaction zone is a partial oxidation zone containing Group VII and/or Group VIII metal-containing steam reforming catalyst.

3. The process of claim 1 in which each mixing nozzle comprises a mixing cup recessed below the face surface of the injector means into which cups the gas streams are separately introduced through individual gas orifices and impinged to form the gaseous premix.

4. The process of claim 3 wherein the mixing cups are cylindrical and have a conical wall section adjacent the floor thereof.

5. The process of claim 3 wherein the mixing cups are provided with boundary layer disrupter means projecting from the face surface of the injector means, at the ejection opening of each of the cups, to retard circulation of the fluidized bed solids into said cups.

6. The process of claim 5 wherein said boundary layer disrupter means includes a narrow radial flange extending inwardly from the face surface of the injector means to reduce the width of the ejection opening of each of said cups.

7. The process of claim 3 wherein said mixing cup includes a short tubular extension neck which projects axially above the face surface of the injector means, around the ejection opening of each of said cups.

8. The process of claim 3 wherein the face surface of the injector means is provided with a protective layer of erosion-resistant composition.

9. The process of claim 1 which comprises passing the gaseous premix into the reaction zone at a velocity between about 25 to 1000 feet/sec.

10. The process of claim 3 in which one of the gases is injected from an axial gas orifice in the floor of each cup, having a diameter ($D_{AX}$) as an axial stream having a momentum and the other gas is injected from one or more radial gas orifices as at least one radial stream having a momentum, which impinges upon the axial stream to form the gaseous premix.

11. The process of claim 10 wherein the efficiency of the mixing ($E_m$) of the individual gases is at least 75% when the gaseous premix is at a distance (L) which is up to ten times the diameter ($D_{AX}$) of the gas orifice of the axial stream.

12. The process according to claim 1 in which the molar proportions of oxygen ($O_2$) per number of carbon atoms in the hydrocarbon are between 0.3 and 0.8.

13. The process according to claim 1 which comprises passing the gaseous premix into the reaction zone within about less than 9 milliseconds after it is formed.

14. The process according to claim 13 which comprises passing the gaseous premix within about less than 2 milliseconds after it is formed.

15. The process according to claim 14 which comprises passing the gaseous premix within about less than 1.0 milliseconds after it is formed.

16. The process according to claim 2 in which said fluidized bed reaction zone comprises a fluidized bed of steam reforming catalyst on aluminum oxide support particles.

17. The process according to claim 1 which comprises supporting said injector means in positions to pass said gaseous premix at an angle of from 0° down to 90° from horizontal into said fluidized bed reaction zone.

18. The process of claim 10 wherein the oxygen or oxygen containing gas is injected as the axial stream and the hydrocarbon containing gas is injected as the one or more radial streams.

19. The process of claim 10 wherein the ratio of the summed momenta of the radially injected streams to the momentum of the axial stream is within the range of 0.5–4.0 to 1.0.

20. The process according to claim 1 which comprises the step of injecting the individual streams through an injector means having a gas manifold assembled from a plurality of thin metal plates forming therebetween or therein and/or therethrough a plurality of segregated gas passages for conveying the individual streams through orifices into said mixing nozzles at the face surface of the injector means.

21. The process according to claim 20 which comprises assembling said plates by diffusion-bonding them together.

22. The process according to claim 20 which comprises providing a plurality of said gas passages beneath and parallel to the plate forming the face surface of the injector means, and circulating at least one of the gases through said gas passages to cool the face surface of the injector means by heat exchange.

23. Process according to claim 1 which comprises the step of further processing the recovered syngas via the Fischer-Tropsch reaction to produce liquid hydrocarbons.

24. Process according to claim 23 which comprises the further step of reacting said liquid hydrocarbons by hydroconversion to produce useful products.

25. The process according to claim 10 which comprises introducing said somewhat radial gas streams as opposed but offset streams which impinge the axial stream tangentially to produce a swirling gas mixture within the mixing cups.

* * * * *